(12) United States Patent
Christiansen et al.

(10) Patent No.: US 12,023,878 B2
(45) Date of Patent: Jul. 2, 2024

(54) VACUUM ASSISTED RESIN TRANSFER MOLDING METHOD, A PRESSURE APPLYING DEVICE AND A MOLD ARRANGEMENT

(71) Applicant: Siemens Gamesa Renewable Energy A/S, Brande (DK)

(72) Inventors: Thomas Lehrmann Christiansen, Aalborg (DK); Donato Girolamo, Voorhout (NL); Peter Fischer Mikkelsen, Hobro (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 1074 days.

(21) Appl. No.: 16/694,165

(22) Filed: Nov. 25, 2019

(65) Prior Publication Data

US 2020/0198264 A1   Jun. 25, 2020

(30) Foreign Application Priority Data

Dec. 21, 2018 (EP) .................................... 18215037

(51) Int. Cl.
  *B29C 70/48* (2006.01)
  *B29L 31/08* (2006.01)
  *F03D 1/06* (2006.01)

(52) U.S. Cl.
  CPC ......... *B29C 70/48* (2013.01); *B29L 2031/085* (2013.01); *F03D 1/0675* (2013.01)

(58) Field of Classification Search
  CPC ......... B29C 70/885; B29C 70/54; B30B 5/02; F03D 80/30; B29L 2031/082
  See application file for complete search history.

(56) References Cited

U.S. PATENT DOCUMENTS 5,152,949 A * 10/1992 Leoni ................... B29C 43/3642
                                                      425/389
5,314,309 A    5/1994 Blakeley et al.
(Continued)

FOREIGN PATENT DOCUMENTS

CA        2786561 C      3/2018
CN     101559652 A      10/2009
(Continued)

OTHER PUBLICATIONS

European Search Report and Written Opinion of the European Searching Authority dated Jul. 2, 2019 and dated Oct. 7, 2019 for Application No. 18215037.5.

*Primary Examiner* — Cynthia L Schaller
(74) *Attorney, Agent, or Firm* — Schmeiser, Olsen & Watts LLP

(57) ABSTRACT

Provided is a vacuum assisted resin transfer molding method for producing a component, in particular a spar cap, of a rotor blade including a lightning protection system, wherein the vacuum assisted resin transfer molding method includes the steps of: a) placing) an electrically conductive beam fiber material of an electrically conductive beam, an electrically conductive fiber mat and an electrical conductor of the component in a mold arrangement electrically connecting the electrically conductive beam fiber material to the electrical conductor by means of the electrically conductive fiber mat, wherein an electrical connection between the electrical conductor and the electrically conductive fiber mat is generated, c) subjecting the mold arrangement to underpressure, d) applying an external pressure on the electrical connection from outside the mold arrangement, e) injecting resin into the underpressurized mold arrangement, and f) applying heat to the mold arrangement for curing the resin.

10 Claims, 7 Drawing Sheets

(56) References Cited

U.S. PATENT DOCUMENTS

| | | | | |
|---|---|---|---|---|
| 5,464,337 | A * | 11/1995 | Bernardon | B29C 51/087 425/389 |
| 6,537,483 | B1 * | 3/2003 | Cartwright | B29C 70/443 264/516 |
| 2009/0257881 | A1 * | 10/2009 | Ostergaard Kristensen | F03D 1/0683 416/229 R |
| 2011/0232829 | A1 * | 9/2011 | Cacace | B29C 73/10 156/349 |
| 2012/0015213 | A1 | 1/2012 | Provost et al. | |
| 2012/0267824 | A1 | 10/2012 | Nothdurft et al. | |
| 2014/0327178 | A1 * | 11/2014 | Davis | B29C 33/02 264/258 |
| 2018/0274517 | A1 | 9/2018 | Gruhn et al. | |
| 2019/0001592 | A1 | 1/2019 | Nielsen et al. | |
| 2019/0145383 | A1 * | 5/2019 | Christiansen | F03D 1/0675 416/146 R |
| 2019/0195190 | A1 | 6/2019 | Girolamo et al. | |
| 2019/0195191 | A1 | 6/2019 | Girolamo et al. | |

FOREIGN PATENT DOCUMENTS

| | | | | |
|---|---|---|---|---|
| CN | 102427932 | A | 4/2012 | |
| CN | 108698341 | A | 10/2018 | |
| EP | 2930355 | A1 | 10/2015 | |
| WO | WO-2017218934 | A1 * | 12/2017 | C08G 59/5006 |

\* cited by examiner

VACUUM ASSISTED RESIN TRANSFER MOLDING METHOD, A PRESSURE APPLYING DEVICE AND A MOLD ARRANGEMENT

CROSS-REFERENCE TO RELATED APPLICATIONS

This application claims priority to European Application No. 18215037.5, having a filing date of Dec. 21, 2018, the entire contents of which are hereby incorporated by reference.

FIELD OF TECHNOLOGY

The following relates to a vacuum assisted resin transfer molding method for producing a component of a rotor blade, to a pressure applying device for a mold arrangement and to a mold arrangement for producing a component of a rotor blade.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Further, the rotor blade is connected to the hub by means of a pitch bearing that allows a pitch movement of the rotor blade. Long rotor blades experience high wind forces.

Rotor blades are the most exposed part of the wind turbine with respect to lightning strikes. Therefore, lightning protection systems (LPS) may be provided. A lightning protection system may comprise a lightning conductor which may be connected to a web of the rotor blade and which may extend along a longitudinal direction of the web. The lightning conductor may be electrically connected to a grounding system of the rotor blade.

When a lightning strike is intercepted by the lightning protection system, the electrical current is transferred to the ground by means of the lightning conductor. However, flash-overs between the lightning conductor and spar caps of the rotor blade which for example may comprise carbon fibers being electrically conductive may occur since the spar caps may provide an alternative path to the ground. Moreover, mutual induction may cause currents in the spar caps. These effects may cause structural damage to the spar caps and possibly catastrophic failure of the blade.

SUMMARY

An aspect relates to an improved method for producing a component of a rotor blade which comprises a lightning system.

Accordingly, a vacuum assisted resin transfer molding (VARTM) method for producing a component, in particular a spar cap, of a rotor blade comprising a lightning protection system is provided. The vacuum assisted resin transfer molding method comprises the steps of: a) placing an electrically conductive beam fiber material of an electrically conductive beam, an electrically conductive fiber mat and an electrical conductor of the component in a mold arrangement, b) electrically connecting the electrically conductive beam fiber material to the electrical conductor by means of the electrically conductive fiber mat, wherein an electrical connection between the electrical conductor and the electrically conductive fiber mat is generated, c) subjecting the mold arrangement to underpressure, d) applying an external pressure on the electrical connection from outside the mold arrangement, e) injecting resin into the underpressurized mold arrangement, and f) applying heat to the mold arrangement for curing the resin.

Due to the external pressure, the electrical quality of the electrical connection between different materials such as the electrically conductive fiber mat and the electrical conductor can be improved. This is because the electrically non-conductive resin which is placed between the electrical conductor and the electrically conductive fiber mat is squeezed out to a minimum thickness of the resin. Further, the variation in quality of the electrical conductivity due to the VARTM manufacturing process can be minimized.

The component is a spar cap of the rotor blade. The component comprises carbon fiber reinforced plastic (CFRP) which is electrically conductive. By using CFRP, the component, in particular the spar cap, can be tailored to transfer the main aerodynamic flapwise and/or edgewise bending loads from the rotor blade to the hub. The electrically conductive beam, in particular the electrically conductive beam fiber material, of the component is designed with unidirectional (UD) fiber reinforced plastic. In particular, the beam is made of UD pultruded CFRP profiles. As a consequence, the beam is electrically conductive since it is made of CFRP material. The component and the beam run in a longitudinal direction of the rotor blade. The longitudinal direction can also be assigned to the component.

The electrically conductive beam fiber material can be dry or already be impregnated or pre-impregnated with resin. In the case that the electrically conductive beam is produced by means of a pultrusion process, the electrically conductive beam fiber material is impregnated or pre-impregnated with resin after pultrusion. Hence, the electrically conductive beam fiber material can in particular be provided as a pultruded profile. In this case, the electrically conductive beam fiber material is impregnated or pre-impregnated with resin so that the electrically conductive beam fiber material itself can form the electrically conductive beam. However, the electrically conductive beam fiber material can also be produced in a hand-layup process of composite layers. The composite layers can be dry or impregnated.

The electrically conductive fiber mat is a carbon fiber mat. The electrically conductive fiber mat can comprise woven or unwoven fiber material, in particular carbon fibers. Electrically conductive fiber mat is made of UD material. The electrical conductor is made of metal. The electrical conductor can be made of woven metal fibers. Therefore, the electrical conductor can be flexible.

The electrical conductor can have a rectangular or substantially rectangular cross-section The electrical conductor is part of the lightning protection system or is connected to the lightning protection system. There are provided a plurality of electrical connections along the longitudinal direction.

The steps a) and b) can be performed at the same time or one after another. The mold arrangement comprises a vacuum bag or several vacuum bags, in or under which the parts of the component are placed. The mold arrangement can also comprise flow nets, air permeable mats and sealings for sealing the mold arrangement. Steps c) and d) are performed at the same time. Step e) is performed during the steps c) and d). The resin is not conductive. The resin mechanically connects the electrically conductive fiber mat to the electrical conductor. In particular, the external pressure is applied before starting the infusion of the resin in step e). This means that step d) starts before and continues during step e) and also during step c). In particular, in step e) the electrically conductive beam fiber material of the electrically conductive beam, the electrically conductive fiber mat and/or the electrical conductor are impregnated or infused with the resin. After step f), the finished component can be removed from the mold arrangement.

"Underpressure" means a pressure below ambient pressure. The underpressure can have around 900 mbar to 1000 mbar. Underpressure can be named as vacuum or is the same as vacuum.

"External pressure" means a pressure which is not applied by the afore mentioned underpressure but by other means. This means, the external pressure and the underpressure are not equal. The external pressure is applied by means of an optional pressure applying device which will be described later. The external pressure is only applied in defined areas of the component and not to the whole component.

However, the external pressure can be applied in any other suitable way. For example, the external pressure can be applied by placing water bags or sand bags on the electrical connection. The external pressure can even be applied manually. "From outside" the mold arrangement means that the external pressure is applied at least through parts of the mold arrangement. For example, the external pressure can be applied through the vacuum bag or further parts of the mold arrangement.

According to an embodiment, in step d) the external pressure is applied on the electrical connection through a vacuum bag of the mold arrangement. The external pressure can also be applied through air permeable mats, flow nets or other parts of the mold arrangement.

According to a further embodiment, in step d) the external pressure is applied on the electrical connection by means of a pressure applying device. As mentioned before, the pressure applying device is optional. The pressure applying device can be removably attached to the mold arrangement. A support structure can be provided for this purpose. The pressure applying device can also be integrated into the mold arrangement.

According to a further embodiment, in step d) the external pressure is applied on a plurality of electrical connections by means of a plurality of pressure applying devices which are arranged in distance from each other along a longitudinal direction of the component. The number of pressure applying devices is equal to the number of electrical connections. The pressure applying device can be integrated in the mold arrangement as a clamp which can be removed after use.

According to a further embodiment, in step d) the external pressure is applied on the electrical connection by means of filling the pressure applying device with a fluid. The fluid is air. However, the fluid can be any other gas like nitrogen or even a liquid like water or oil.

According to a further embodiment, in step d) the fluid inflates a chamber of the pressure applying device for deforming a flexible film thereof, wherein the external pressure is applied to the electrical connection by means of the flexible film. The flexible film is a silicone film. A pump can be used to fill the chamber with the fluid.

According to a further embodiment, in step d) the flexible film adapts to a geometry of the electrical connection for an evenly distribution of the external pressure. This improves the quality of the electrical connection because the flexible film snuggles to the geometry of the electrical conductor and presses the electrically conductive fiber mat close to the electrical conductor. Therefore, superfluous resin is squeezed out of the electrical connection.

According to a further embodiment, in step d) the chamber is inflated with the fluid by means of a manual pump. However, the pump can also be an electric pump or any other suitable pump. The pump can be connected to a fluid supply which supplies the fluid to the chamber. The fluid supply can be a tube that is guided through a base plate of the pressure applying device into the chamber.

According to a further embodiment, the underpressure is reduced before applying heat in step f). This reduces the size of air bubbles being entrapped in the resin. This improves the quality of the component. As mentioned above, the underpressure has around 900 mbar to 1000 mbar. The underpressure can be reduced to a pressure in the range of 500 mbar to 800 mbar. The external pressure can have around 100 mbar to 2000 mbar.

Furthermore, a pressure applying device for a mold arrangement for producing a component, in particular a spar cap, of a rotor blade comprising a lightning protection system is provided. The pressure applying device comprises an inflatable chamber and a flexible film which seals the chamber, wherein the chamber can be inflated with a fluid for deforming the flexible film. The flexible film can be named flexible foil. As mentioned above, the flexible film is a silicone film. However, the flexible film can be made of any other suitable flexible material. The chamber can be an air chamber. The flexible film is reinforced, in particular fiber-reinforced.

According to an embodiment, the pressure applying device comprises a base plate and a frame running around edges of the base plate, wherein the frame connects the flexible film to the base plate. Compared to the flexible film, the base plate is stiff and can be made of glass fiber reinforced plastic (GFRP). However, the base plate can also be made of CFRP or metal. The base plate can have a rectangular shape. However, the base plate can have any suitable shape. The frame can be attached to the base plate by means of bolts. However, the frame can be attached to the base plate in any other suitable way.

According to a further embodiment, the frame comprises a first frame element and a second frame element, wherein the flexible film is sandwiched between the first frame element and the second frame element. Between the frame elements can be provided a sealing for sealing the frame elements and the flexible film towards each other. Between the frame and the base plate can also be provided a sealing for sealing the frame towards the base plate.

According to a further embodiment, the pressure applying device comprises a manometer for measuring a pressure of the fluid in the chamber. The manometer can be attached to the fluid supply for reading the pressure in the chamber. However, any other device or sensor can be used for measuring the pressure in the chamber.

Additionally, a mold arrangement for producing a component, in particular a spar cap, of a rotor blade comprising a lightning protection system is provided. The mold arrangement comprises at least one pressure applying device as mentioned before.

According to an embodiment, the mold arrangement comprises a vacuum bag which encloses an electrically conductive beam fiber material of an electrically conductive beam, an electrically conductive fiber mat and an electrical conductor of the component, wherein the at least one pressure applying device is arranged outside the vacuum bag. The pressure device applies the external pressure through the vacuum bag on the electrical connection. The mold arrangement can comprise a plurality of vacuum bags, flow nets, air permeable mats and other parts that are necessary to perform the VARTM process. The pressure device applies the external pressure through these parts of the mold arrangement on the electrical connection.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
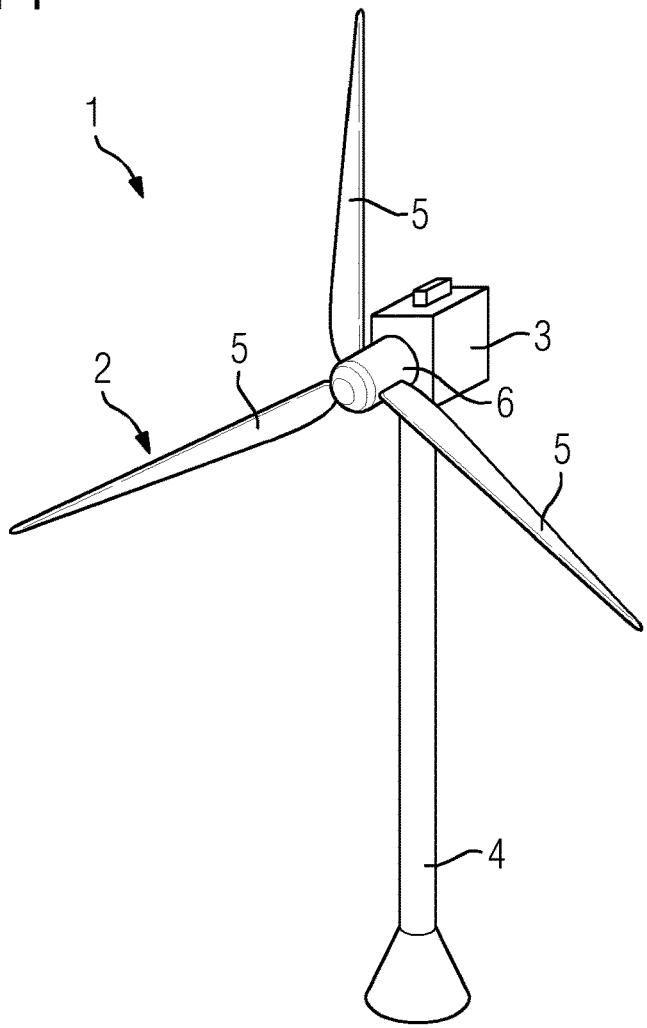
FIG. 1 shows a perspective view of a wind turbine according to one embodiment.

FIG. 1 shows a wind turbine 1 according to one embodiment.

"Wind turbine" presently refers to an apparatus converting the wind's kinetic energy into rotational energy, which may again be converted to electrical energy by the apparatus.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Oftentimes, glass fibers in the form of unidirectional fiber mats are used.

Figure 2:
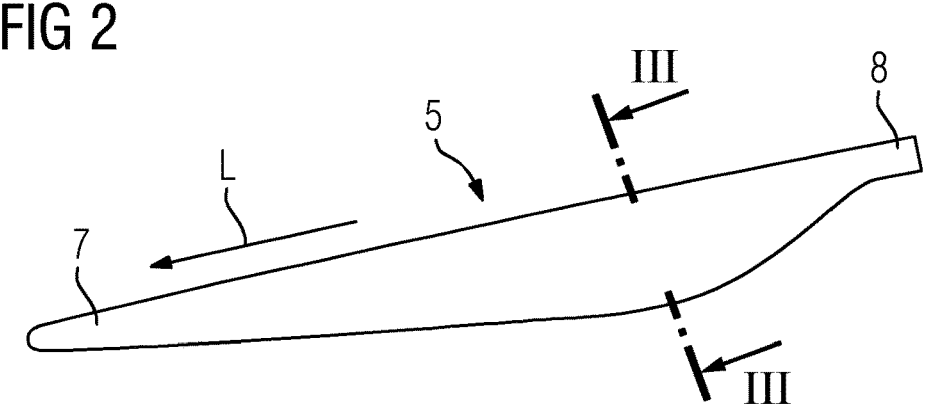
FIG. 2 shows a perspective view of a wind turbine rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6. The rotor blade 5 comprises a longitudinal direction L. The longitudinal direction L is directed from the blade root 8 in direction of the aerodynamically designed portion 7. However, the longitudinal direction L can be oriented vice versa.

Figure 3:
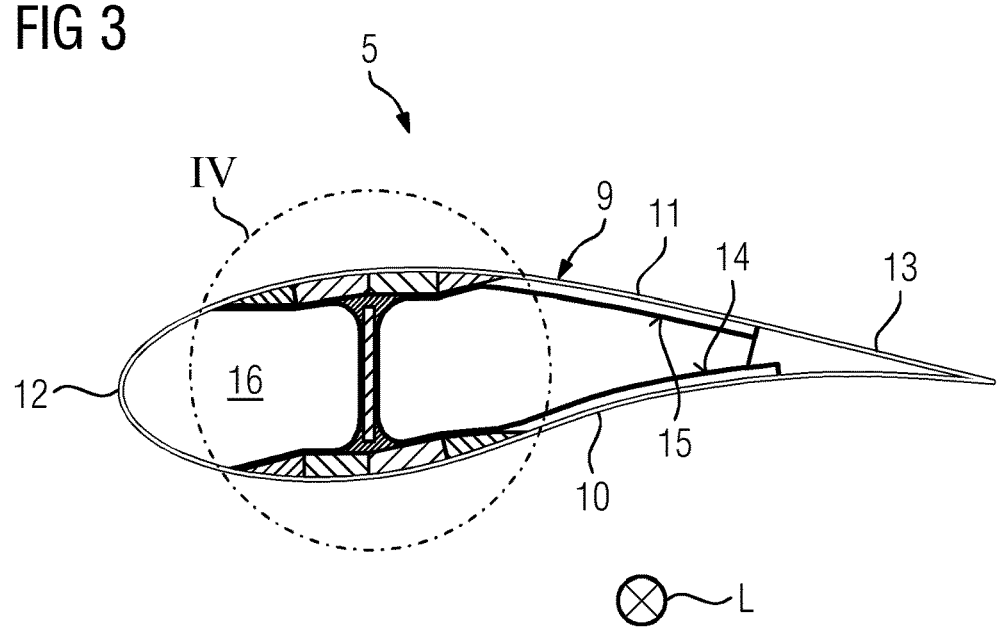
FIG. 3 shows a cross-sectional view of the wind turbine rotor blade along the intersection line III-III of FIG. 2.
Figure 4:
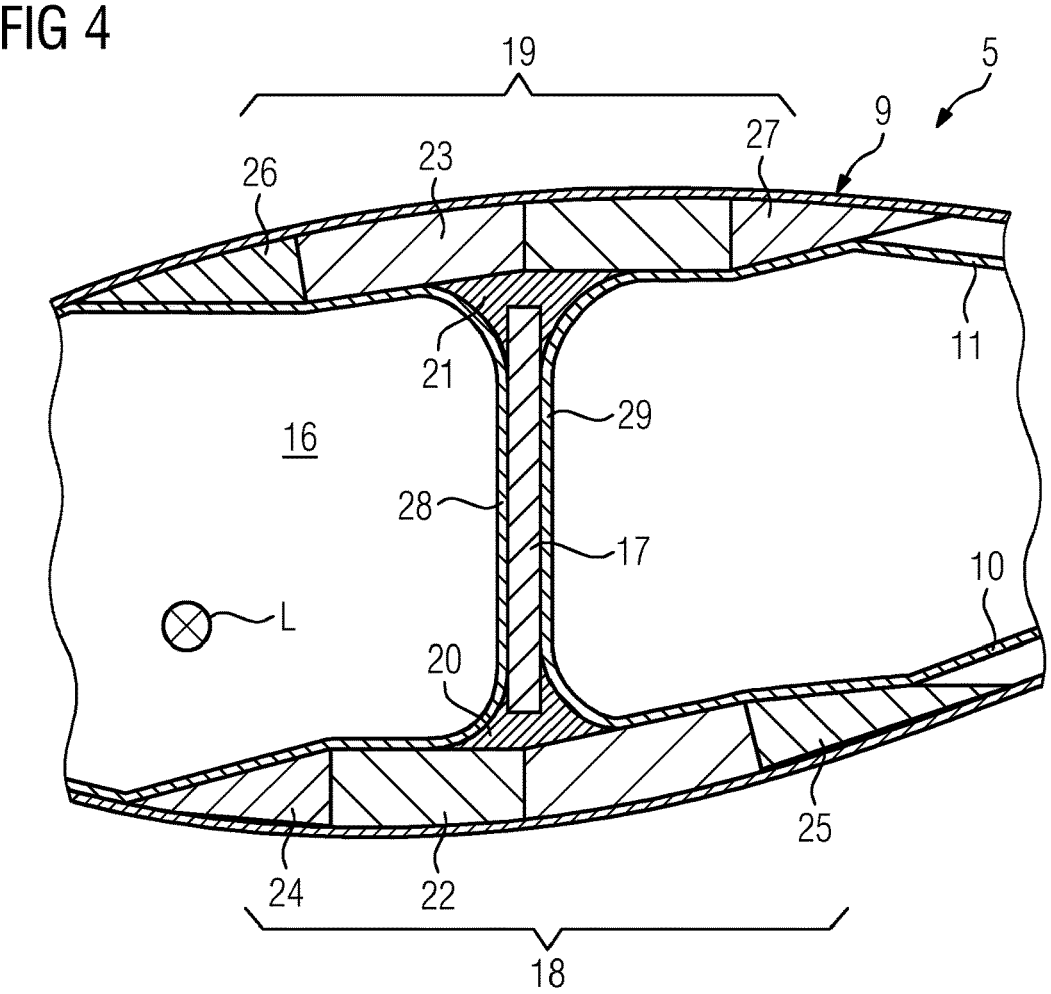
FIG. 4 shows the detail view IV according to FIG. 3.

FIG. 3 shows a cross-sectional view of the rotor blade 5 according to the intersection line III-III in FIG. 2. FIG. 4 shows a detail view of the rotor blade 5. In the following, FIGS. 3 and 4 are referred to at the same time.

The rotor blade 5 has an outer blade shell 9 comprising a first half-shell 10 and a second half-shell 11 which are connected to each other at a leading edge 12 of the rotor blade 5. The half-shells 10, 11 are also connected to each other on a trailing edge 13 of the rotor blade 5. The trailing edge 13 can be in the form of a wedge-shaped element which extends in the longitudinal direction L. The outer blade shell 9 may comprise composite fiber material, in particular glass fiber mats. The fiber material is impregnated with a polymer material, in particular with resin. Further, the first half-shell 10 and the second half-shell 11 may be glued together. Alternatively, the outer blade shell 9, namely the first half-shell 10 and the second half-shell 11, may be provided as a one-piece element.

The first half-shell 10 comprises an inner surface 14 and the second half-shell 11 comprises an inner surface 15 being arranged opposite to each other and facing each other. An inner space 16 of the rotor blade 5 is defined by means of the inner surfaces 14, 15. A web 17 is located inside the inner space 16 extending from the inner surface 14 of the first half-shell 10 to the inner surface 15 of the second half-shell 11. The web 17 runs in the longitudinal direction L. The web 17 comprises fiber composite material, in particular glass fiber mats. As mentioned before, the fiber composite material is infused with resin.

The rotor blade 5 further comprises a first component 18 and a second component 19. The longitudinal direction L can be assigned to the components 18, 19. The components 18, 19 are spar caps and will be named spar caps in the following. There is provided a first spar cap 18 and a second spar cap 19. However, the following explanations concerning the spar caps 18, 19 can be applied to any other components of the rotor blade 5.

The web 17 is arranged between the spar caps 18, 19. The web 17 is connected to the spar caps 18, 19 by means of a first connecting element 20 and a second connecting element 21. The connecting elements 20, 21 both run along the longitudinal direction L. The first spar cap 18 is connected to the first half-shell 10 and the second spar cap 19 is connected to the second half-shell 11. The web 17 and the spar caps 18, 19 are part of a support structure which prevents breaking or crippling of the rotor blade 5.

The first spar cap 18 and the second spar cap 19 extend along the longitudinal direction L. Each spar cap 18, 19 has an electrically conductive beam 22, 23 running along the longitudinal direction L. The first spar cap 18 comprises a first electrically conductive beam 22 and the second spar cap 19 comprises a second electrically conductive beam 23. Each spar cap 18, 19 also has two core wedges 24 to 27 which have a wedge-shaped cross-section and run along the longitudinal direction L. The first electrically conductive beam 22 is sandwiched between two first core wedges 24, 25 and the second electrically conductive beam 23 is sandwiched between two second core wedges 26, 27.

Plies 28, 29, in particular glass fiber mats, can be provided on both sides of the web 17. The plies 28, 29 cover the web 17 and at least partially the spar caps 18, 19. The plies 28, 29 can be attached to the inner surfaces 14, 15 of the half-shells 10, 11 of the outer blade shell 9. The rotor blade 5 also has a lightning protection system (LPS) which is not shown in FIGS. 3 and 4.

Turning now back to the spar caps 18, 19. Carbon fiber reinforced plastic (CFRP) materials are very attractive for the use in the structural design of rotor blades 5 due to their high stiffness-to-weight and strength-to-weight ratios. The structural components which are most suitable to be designed in CFRP are the spar caps 18, 19. The spar caps 18, 19 can be tailored to transfer the main aerodynamic flapwise and/or edgewise bending loads from the rotor blades 5 to the hub 6 and ultimately to foundations of the tower 4. Spar caps 18, 19, in particular the electrically conductive beams 22, 23 of the spar caps 18, 19, are usually designed with unidirectional (UD) fiber reinforced plastics. In particular, the electrically conductive beams 22, 23 are made of UD pultruded CFRP profiles. As a consequence, the electrically conductive beams 22, 23 are electrically conductive since they are made of CFRP material.

Figure 5:
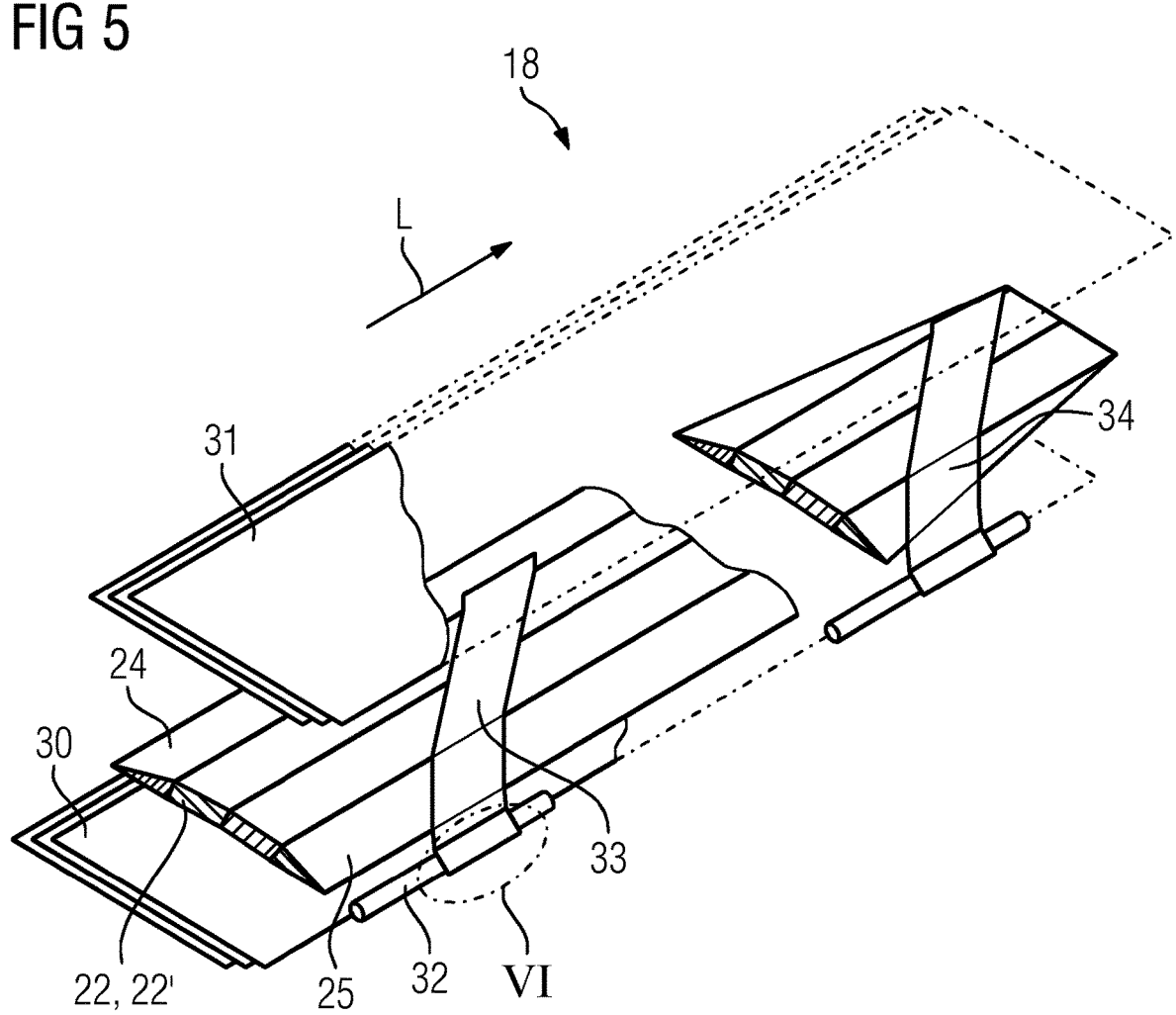
FIG. 5 shows a perspective exploded view of one embodiment of a component of the wind turbine rotor blade according to FIG. 2.
Figure 6:
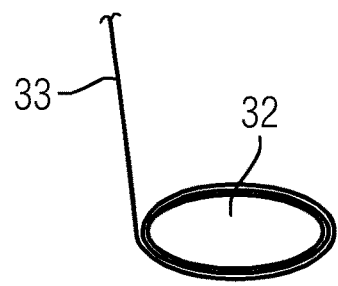
FIG. 6 shows the detail view VI according to FIG. 5.

FIG. 5 shows an exploded view of the first spar cap 18. FIG. 6 shows a detail view of the first spar cap 18. In the following, FIGS. 5 and 6 are referred to at the same time.

Both spar caps 18, 19 have an identical design. For this reason, in the following reference is only made to the first spar cap 18. However, all explanations concerning the first spar cap 18 are applicable to the second spar cap 19. As mentioned before, the first spar cap 18 has a first electrically conductive beam 22 which is provided in the form of a UD pultruded CFRP profile. The first electrically conductive beam 22 as well as the second electrically conductive beam 23 are made of an electrically conductive beam fiber material 22'.

The electrically conductive beam fiber material 22' can be dry or already be impregnated or pre-impregnated with resin. In the case that the first electrically conductive beam 22 is produced by means of a pultrusion process, the electrically conductive beam fiber material 22' is preferably impregnated or pre-impregnated with resin after pultrusion. The first electrically conductive beam 22, in particular the electrically conductive beam fiber material 22', is sandwiched between the two first core wedges 24, 25. The first spar cap 18 also has cover mats 30, 31 which cover the first electrically conductive beam 22 and the first core wedges 24, 25 from both sides. The cover mats 30, 31 are made of glass fibers. The core wedges 24 to 27 are electrically non-conductive.

As mentioned before, the rotor blade 5 has a lightning protection system. The first spar cap 18 comprises an electrical conductor 32, in particular a metal conductor, which is part of the lightning protection system. The electrical conductor 32 runs along the longitudinal direction L. However, the electrical conductor 32 could also run in any other direction. The electrical conductor 32 can be made of woven metal fibers. In particular, the electrical conductor 32 is flexible. The electrical conductor 32 has a flattened rectangular cross-section. However, the electrical conductor 32 can have any desirable cross-section. For example, the electrical conductor 32 can have an oval or circular cross-section.

The lightning protection system also has electrically conductive fiber mats 33, 34 which electrically connect the first electrically conductive beam 22 to the electrical conductor 32. The electrically conductive fiber mats 33, 34 can be carbon fiber mats. The electrically conductive fiber mats 33, 34 can be made of woven or of unwoven fiber material. The electrically conductive fiber mats 33, 34 can be arranged at an angle of 45° towards the longitudinal direction L. However, any other angle between 30° and 60° can be used for placing the electrically conductive fiber mats 33, 34. There is provided a plurality of electrically conductive fiber mats 33, 34 which are distributed in the longitudinal direction L. As can be seen from FIG. 6, the electrically conductive fiber mats 33, 34 can be wrapped around the electrical conductor 32.

Figure 7:
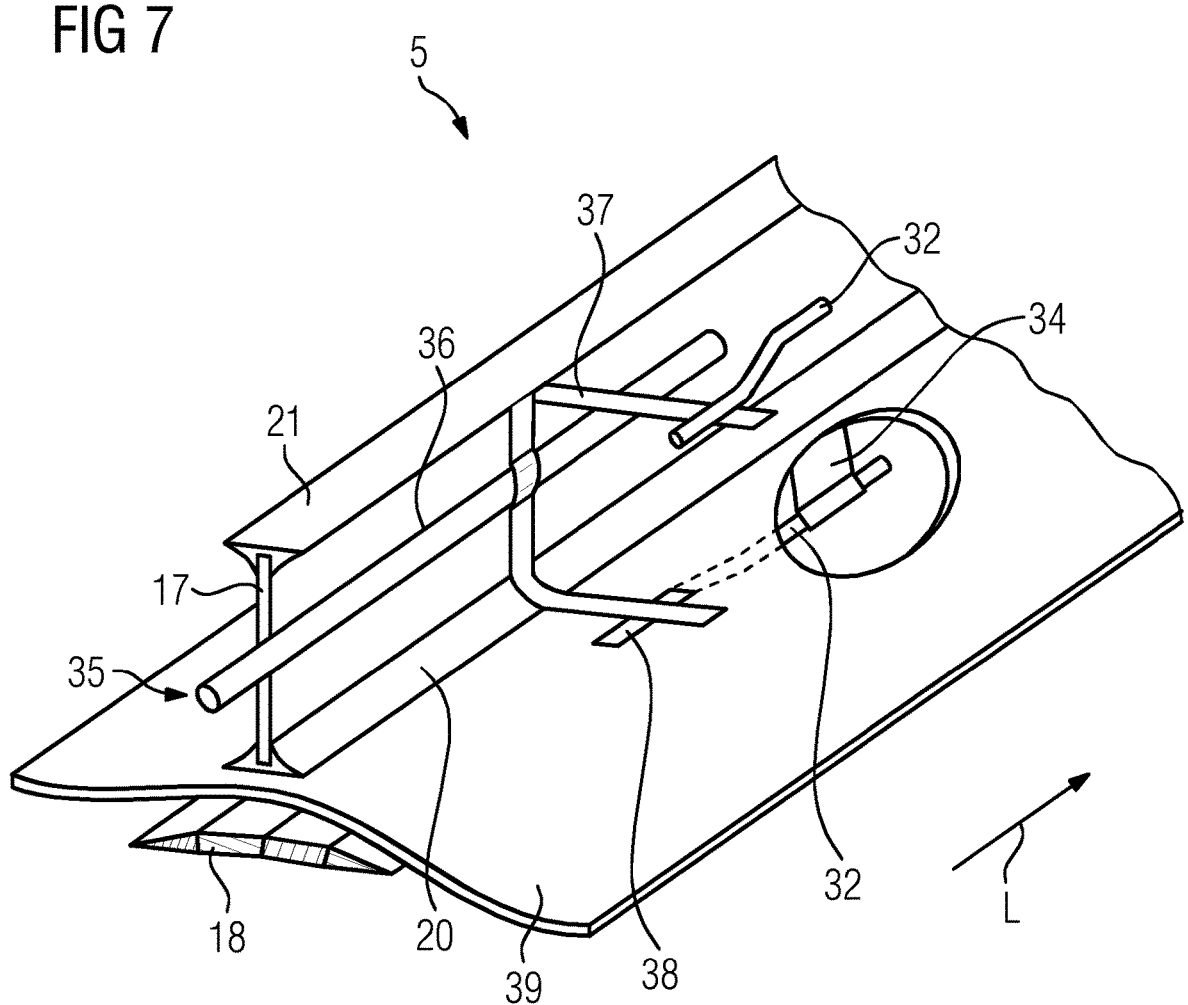
FIG. 7 shows a perspective partial view of the wind turbine rotor blade according to FIG. 2.

FIG. 7 shows a partial perspective view of the rotor blade 5.

As mentioned before, the rotor blade 5 has a lightning protection system 35. The lightning protection system 35 comprises the electrical conductor 32 and the electrically conductive fiber mats 33, 34. The lightning protection system 35 further comprises a down conductor 36 which can be attached to the web 17 and which runs in the longitudinal direction L. The down conductor 36 can be made of woven metal fibers. Hence, the down conductor 36 can be flexible. There can be provided more than one down conductor 36.

The lightning protection system 35 also comprises a chordwise conductor 37 which electrically connects the electrical conductors 32 of the two spar caps 18, 19 to the down conductor 36. The chordwise conductor 37 can also be made of metal fibers and can therefore be flexible. The chordwise conductor 37 is electrically connected to the electrical conductor 32 at electrical terminals 38 thereof. The spar caps 18, 19 can be covered by means of an inner shell 39. The inner shell 39 is arranged between the connecting elements 20, 21 and the spar caps 18, 19. The inner shell 39 can be made of glass fiber mats. The electrical terminals 38 can be formed as breakthroughs or openings in the inner shell 39.

The most common production process used to fabricate components for rotor blades 5 is vacuum assisted resin transfer molding (VARTM). VARTM consists of applying vacuum or underpressure to the dry composite layup and injecting a polymer material or plastic also known as resin, for example epoxy, in liquid state. After applying heat and keeping the vacuum pressure the resin cures and solidifies. This process becomes challenging when very large structures need to be injected and cured. Larger sections, longer spans, thicker structural components make the resin flow very complex to design and optimize. They increase the risk of extended manufacturing errors such as transverse wrinkles, poor impregnation, air pockets or large areas with dry fibers.

These errors can extend over wide areas and also can be very time consuming and very costly to repair and can therefore drastically affect the cost and reliability of the final product. If these errors appear during the manufacturing of the full rotor blade 5, they can be very expensive to repair and lead to scrapping the full rotor blade 5.

Furthermore, CFRP, compared to the less performant glass fiber reinforced plastic (GFRP), that is more commonly used in the industry (the stiffness-to-weight ratio of GFRP is usually five times lower than CFRP), is electrically conductive and can interact with the lightning protection system 35 when the rotor blade 5 intercepts a lightning strike. If not properly coordinated with the lightning protection system 35, the CFRP structural elements can fail due to direct lightning hit and/or flashovers from the down conductor 36 of the lightning protection system 35 while leading the current to the ground.

The issues highlighted in the previous two paragraphs can be tackled by means of so-called "precasted technologies". In doing so, carbon sub-components of the rotor blade 5, for example the spar caps 18, 19, are pre-manufactured with integrated electrical terminals 38 prior to be embedded in the blade structure and in the lightning protection system 35.

Figure 8:
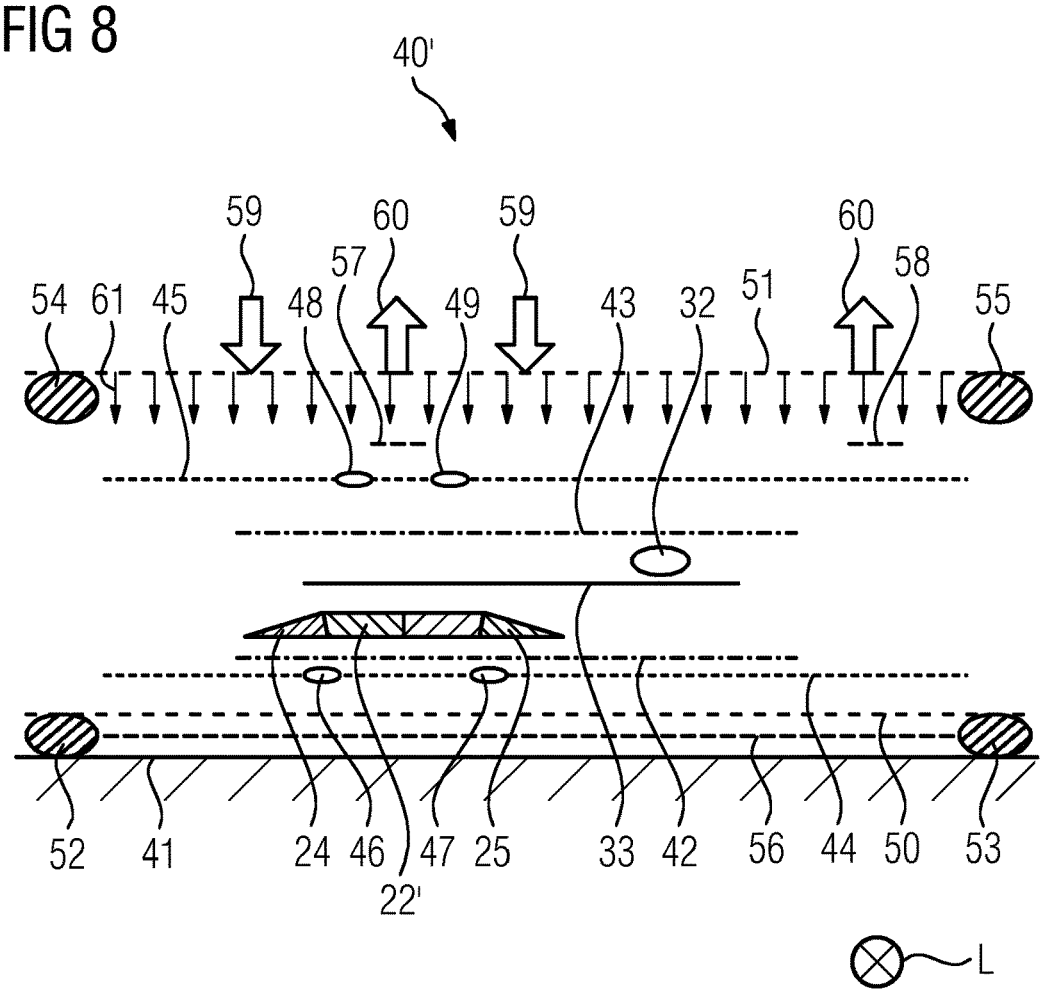
FIG. 8 shows an exploded cross-sectional view of one embodiment of a mold arrangement for producing the component according to FIG. 5.

FIG. 8 shows a cross-sectional view of a mold arrangement 40' for producing spar caps 18, 19.

The mold arrangement 40' can be a mold for producing the spar caps 18, 19. The mold arrangement 40' is suitable for performing a VARTM process. The mold arrangement 40' comprises a support 41 which can be a lower mold half. The electrically conductive beams 22, 23, in particular the electrically conductive beam fiber material 22' of the electrically conductive beams 22, 23, the core wedges 24 to 27, the electrically conductive fiber mats 33, 34 and the electrical conductor 32 are sandwiched between two cover mats 42, 43. The cover mats 42, 43 can be glass fiber mats. The cover mats 42, 43 are dry. The cover mats 42, 43 can be part of the inner shell 39.

The components of the spar cap 18, 19 are sandwiched between two flow nets 44, 45. The flow nets 44, 45 both comprise resin delay lines 46 to 49. The flow nets 44, 45 are optional and can be tailored to different materials and/or arrangements. The flow nets 44, 45 are sandwiched between two vacuum bags 50, 51. The two vacuum bags 50, 51 can be connected together to form one vacuum bag. However, if the support 41 is air-tight, only the vacuum bag 51 is required. The vacuum bag 51 can be named upper or top vacuum bag. Each vacuum bag 50, 51 has a plurality of sealings 52 to 55.

An air permeable mat 56 is arranged between the support 41 and the vacuum bag 50. Further air permeable mats 57, 58 are arranged between the flow net 45 and the vacuum bag 51. The air permeable mats 56 to 58 are optional. The mold arrangement 40' can be put into practice in any other way.

As mentioned before, the carbon spar cap manufacturing process is VARTM. The VARTM injection strategy adopted for casting carbon spar caps 18, 19 is as follows. Resin 59 in liquid state is injected from the sides while air 60 is sucked in the middles of the spar cap assembly. However, this can change depending on the materials used and/or different arrangements. Underpressure or vacuum pressure 61 of approximately 900 mbar to 1000 mbar is reached by sucking the air 60 out of the vacuum bags 50, 51. After resin 59 is injected, heat is applied through the vacuum bags 50, 51 and the spar cap 18, 19 is cured in order to have the resin above its glass transition point. An autoclave can be used for this purpose. However, heat also can be applied via the mold arrangement 40' itself, for example by means of the support 41.

The electrical connection between the electrical conductor 32 and the electrically conductive fiber mats 33, 34 is also achieved through VARTM. This electrical connection is a very critical detail of the design since part of the electrical high current (HC) that goes through the lightning protection system 35 in case of a lightning strike, needs to be effectively transferred through it.

Therefore, it is important to guarantee adequate electrical conductivity of the connection and to ensure that the connection quality homogeneity is ensured by the manufacturing process.

Figure 9:
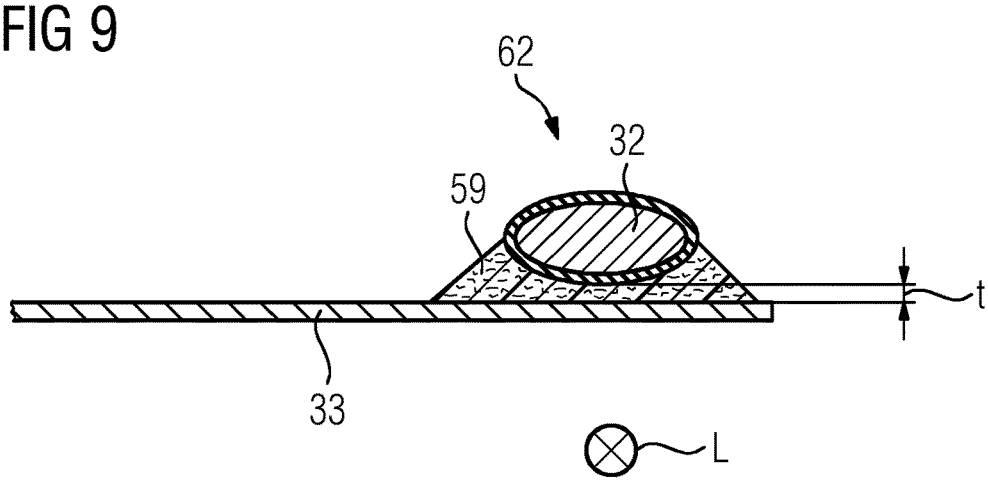
FIG. 9 shows an enlarged cross-sectional view of an electrical connection of the component according to FIG. 5.

FIG. 9 shows a cross-sectional view of an electrical connection 62 between the electrical conductor 32 and the electrically conductive fiber mat 33.

The electrical conductor 32 is mechanically connected to the electrically conductive fiber mats 33, 34 by means of the resin 59. The electrical conductivity of the metal-to-carbon electrical connection 62 between the electrical conductor 32 and the electrically conductive fiber mats 33, 34 depends upon different parameters. One of the most important parameters is the pressure applied to the electrical connection 62. Sufficient pressure will ensure maximum number of contact points between the carbon and the metal. The pressure also ensures that a residual layer of resin 59 that cures between the electrical conductor 32 and the electrically conductive fiber mats 33, 34 will be kept at a minimum. In other words, a thickness t of the resin 59 between the electrical conductor 32 and the electrically conductive fiber mats 33, 34 must be kept at a minimum.

The resin 59 enables a mechanical connection between the electrical conductor 32 and the electrically conductive fiber mats 33, 34. However, since the resin 59 itself is a non-conductive material, it ideally should be avoided in the connection joint. One strategy to improve the electrical connection 62 relies on the underpressure 61 applied on the electrical connection 62 through the vacuum bags 50, 51 prior to injection of the resin 59. It is known that when the resin 59 flows in the vacuum bags 50, 51 underpressure 61 reduces. The reduction is approximately equal to the pressure required to maintain a liquid column corresponding to the height difference between the mold arrangement 40' and the resin level. It can be in the order of 100 mbar to 2000 mbar.

Additionally, it is good practice at the end of resin injection and prior to resin solidification to decrease the pressure on the cast in order to minimize the volume of any entrapped air bubbles and to reduce it below the allowable size. The decrease of pressure can have a negative effect on the quality of the electrical connection 62.

Figure 10:
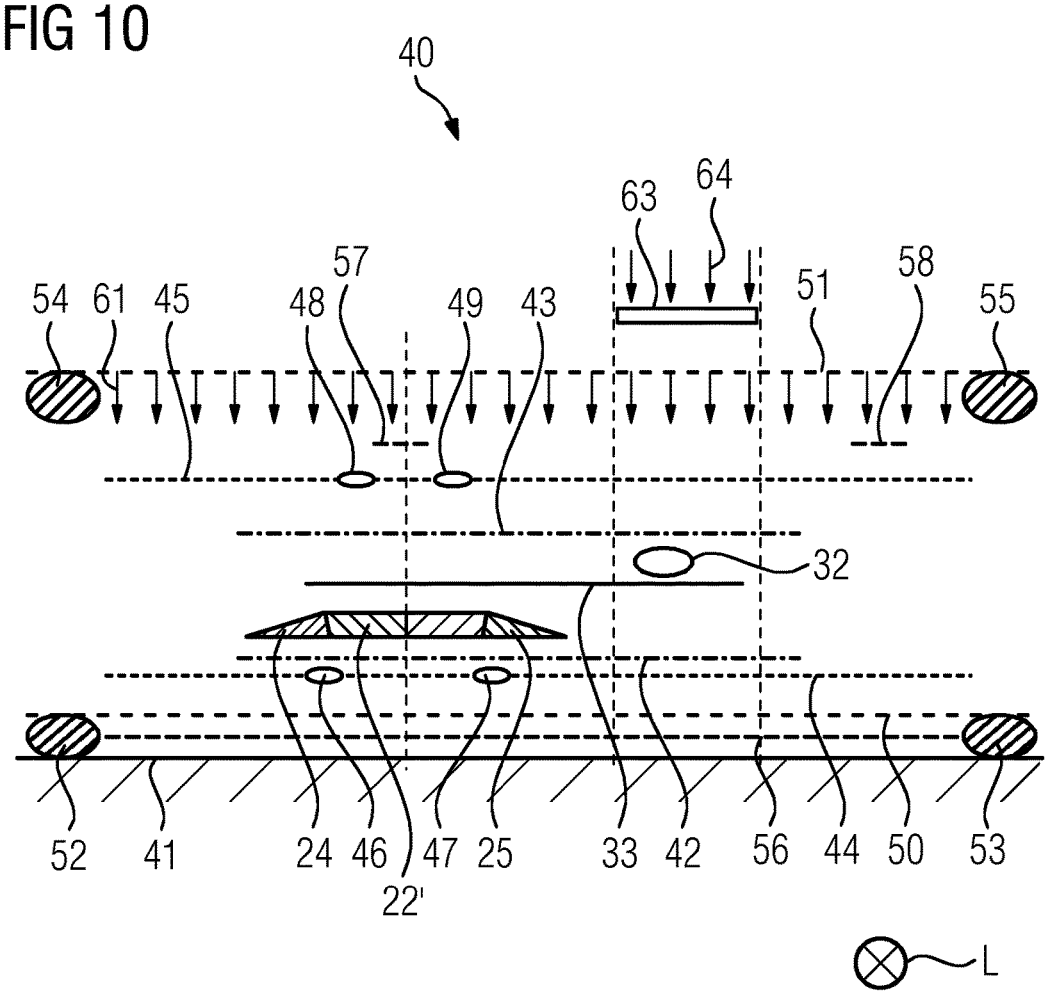
FIG. 10 shows an exploded cross-sectional view of another embodiment of a mold arrangement for producing the component according to FIG. 5.

FIG. 10 shows a cross-sectional view of a mold arrangement 40 which solves the afore mentioned issues.

The mold arrangement 40 according to FIG. 10 is an improved embodiment of the mold arrangement 40' shown in FIG. 8. The mold arrangement 40 differs from the mold arrangement 40' in an additional pressure applying device 63 for applying extra or external pressure 64 to the electrical connection 62 between the electrical conductor 32 and the electrically conductive fiber mats 33, 34.

"External" means that the external or extra pressure 64 is not applied by the underpressure 61 but only by the pressure applying device 63 from outside the mold arrangement 40. The pressure applying device 63 is suitable to apply the uniformly distributed extra pressure 64 on the electrical connection 62 during the VARTM process. The extra pressure 64 is in the order of but not limited to 100 mbar to 2000 mbar. The external pressure 64 is uniformly applied from outside, in particular on the top of the vacuum bag 51. This extra pressure 64 will compensate for the loss in pressure on the electrical connection 62 due to the inflow of the resin 59.

Figure 11:
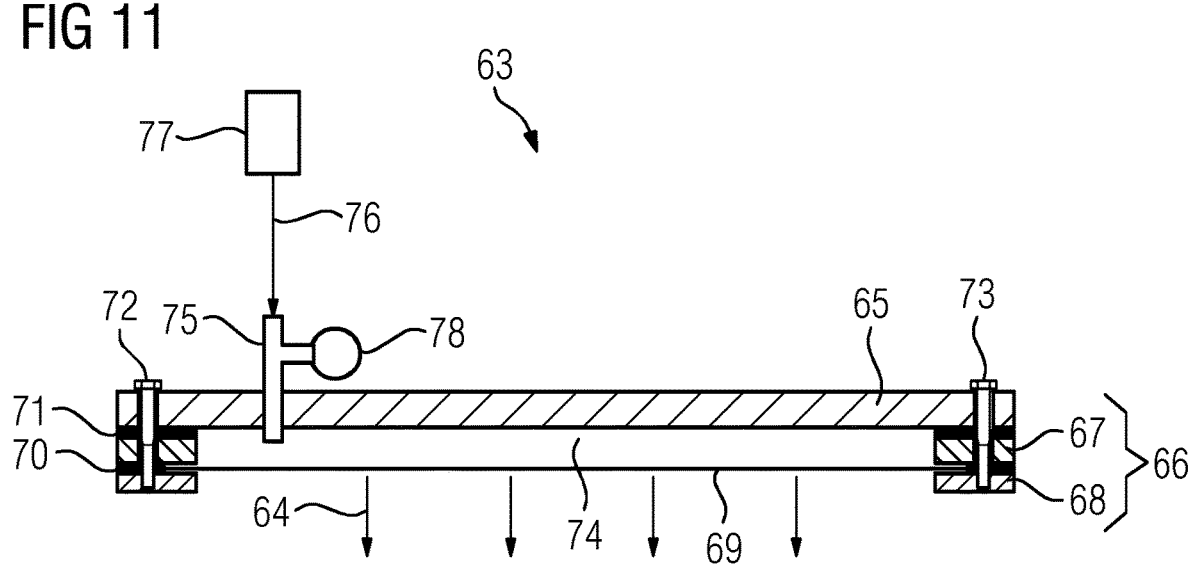
FIG. 11 shows a cross-sectional view of one embodiment of a pressure applying device for the mold arrangement according to FIG. 10.

FIG. 11 shows a cross-sectional view of a preferred embodiment of the pressure applying device 63.

The pressure applying device 63 can be operated manually or automatically. The mold arrangement 40 has a plurality of pressure applying devices 63. In particular, on each electrical terminal 38 or on each electrical connection 62 can be placed one pressure applying device 63. The pressure applying device 63 can also be named tool. The pressure applying device 63 has a base plate 65. The base plate 65 is stiff and can be made of GFRP. However, the base plate 65 can also be made of CFRP or metal. The base plate 65 can have a rectangular shape. However, the base plate 65 can have any suitable shape.

Furthermore, the device comprises a frame 66. The frame 66 runs along edges of the base plate 65. The frame 66 comprises two frame elements 67, 68. A first frame element 67 and a second frame element 68 are provided. A flexible foil or film 69, in particular a silicone film, is sandwiched between the frame elements 67, 68 to firmly attach the flexible film 69 to the frame 66.

In particular, the flexible film 69 is a reinforced, fiber-reinforced, silicone film. The reinforcement prevents burst of the flexible film 69 in small gaps between the frame 66 and the mold arrangement 40. Between the frame elements 67, 68 is provided a sealing 70, in particular a silicone sealing, for sealing the frame elements 67, 68 and the flexible film 69 towards each other.

Between the frame 66 and the base plate 65 is also provided a sealing 71 for sealing the frame 66 towards the base plate 65.

The frame 66 can be attached to the base plate 65 by means of bolts 72, 73. However, the frame 66 can be attached to the base plate 65 in any other suitable way. Between the flexible film 69 and the base plate 65 is provided an inflatable chamber 74, in particular an air chamber. The chamber 74 can inflated by means of a fluid supply 75 which supplies a fluid 76 to the chamber 74. The fluid 76 can be air or any other gas. The fluid 76 can also be a liquid. The fluid supply 75 can be a tube that is guided through the base plate 65 into the chamber 74.

The fluid 76 can be supplied by means of a pump 77. The pump 77 can be an air pump. In particular, the pump 77 can be a manual pump. A manometer 78 can be attached to the fluid supply 75 for reading the pressure in the chamber 74. In operation of the pressure applying device 63, the fluid 76 is pressed in the chamber 74 by means of the pump 77 and the pressure in the chamber 74 can be read by means of the manometer 78. The flexible film 69 inflates without breaking and/or leaking and assumes the outer shape of the electrical connection 62 on which uniform external or extra pressure 64 is applied during the VARTM process.

The pressure applying device 63 is integrated into the mold arrangement 40. The pressure applying device 63 can be supported by a support structure to apply the external pressure 64 to the electrical connection 62. The support structure can be part of the mold arrangement 40. For example, the support structure can be attached to the support 41.

The pressure applying device 63 has the following advantages. The electrical quality of the electrical connection 62 between different materials such as the electrically conductive fiber mats 33, 34 and the electrical conductor 32 can be improved. A quality control of the electrical connection 62 during the process can be easily achieved by monitoring the external pressure 64 in the chamber 74 of the pressure applying device 63. The variation in quality of the electrical conductivity due to the manufacturing process can be minimized. The pressure applying device 63 can be integrated in the mold arrangement 40 as a clamp with an embedded inflatable flexible film 69.

Figure 12:
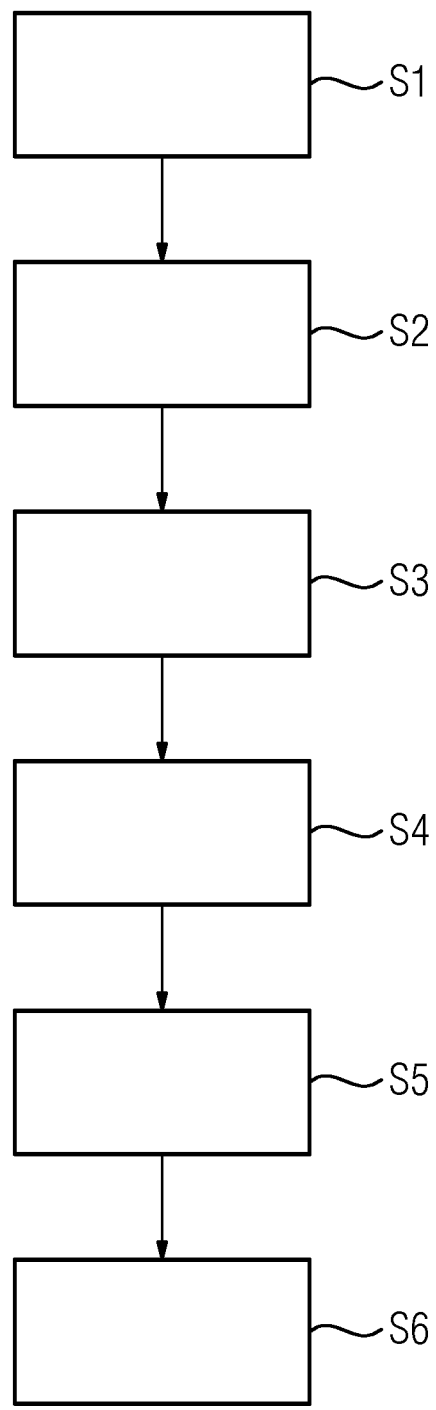
FIG. 12 shows a block diagram of one embodiment of a method for producing a component according to FIG. 5.

FIG. 12 shows a block diagram of an embodiment of a VARTM method for producing the spar caps 18, 19.

The VARTM method comprises the following method steps. In a step S1, the electrically conductive beam fiber material 22' of the electrically conductive beam 22, 23, the electrically conductive fiber mats 33, 34 and the electrical conductor 32 of the spar caps 18, 19 are placed in the mold arrangement 40. The electrically conductive beam fiber material 22' can be provided as a pultruded profile. In this case, the electrically conductive beam fiber material 22' is already impregnated or pre-impregnated with resin so that the electrically conductive beam fiber material 22' itself forms the electrically conductive beam 22, 23. However, the electrically conductive beam fiber material 22' can be produced in a hand-layup process of composite layers. The composite layers can be dry or impregnated.

In a step S2, the electrically conductive beam fiber material 22' is electrically connected to the electrical conductor 32 by means of the electrically conductive fiber mats 33, 34, wherein the electrical connection 62 between the electrical conductor 32 and the electrically conductive fiber mats 33, 34 is generated. The steps S1 and S2 can be performed at the same time or one after another.

In a step S3, the mold arrangement 40 is subjected to underpressure 61, in particular to vacuum.

In a step S4, the external pressure 64 is applied on the electrical connection 62 from outside the mold arrangement 40. In other words, the external pressure 64 is applied at least through the vacuum bags 50, 51 and/or other parts of the mold arrangement 40. The external pressure 64 is applied by means of the pressure applying device 63. In a step S5, the resin 59 is injected into the underpressurized mold arrangement 40. The steps S3 to S5 are done at the same time. In particular, the external pressure 64 is applied before the infusion of the resin 59 in step S5. This means that step S4 starts before and continues during step S5.

However, the external pressure 64 can be applied in any other suitable way. For example, the external pressure 64 can be applied by placing water bags or sand bags on the electrical connection 62. In a final step S6, heat is applied to the mold arrangement 40 for curing the resin 59.

Thereby, the resin 59 is heated above its glass transition temperature. An autoclave can be used to apply the heat. As mentioned before, also the mold arrangement 40 itself can apply the heat.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A vacuum assisted resin transfer molding method for producing a component of a rotor blade comprising a lightning protection system, the vacuum assisted resin transfer molding method comprising:
   a) placing an electrically conductive beam fiber material of an electrically conductive beam, an electrically conductive fiber mat and an electrical conductor of the component in a mold arrangement;
   b) electrically connecting the electrically conductive beam fiber material to the electrical conductor by means of the electrically conductive fiber mat, wherein an electrical connection between the electrical conductor and the electrically conductive fiber mat is generated,
   c) subjecting the mold arrangement to underpressure;
   d) applying an external pressure on the electrical connection from outside the mold arrangement by inflating an inflatable chamber of a pressure applying device, before resin is injected into the mold arrangement;
   e) injecting resin into the mold arrangement; and
   f) applying heat to the mold arrangement for curing the resin.

2. The vacuum assisted resin transfer molding method according to claim 1, wherein in step d) the external pressure is applied on the electrical connection through a vacuum bag of the mold arrangement.

3. The vacuum assisted resin transfer molding method according to claim 1, wherein in step d) the external pressure is applied on a plurality of electrical connections by means of a plurality of pressure applying devices which are arranged in distance from each other along a longitudinal direction of the component.

4. The vacuum assisted resin transfer molding method according to claim 1, wherein in step d) the external pressure is applied on the electrical connection by means of filling the pressure applying device with a fluid.

5. The vacuum assisted resin transfer molding method according to claim 4, wherein in step d) the fluid inflates the inflatable chamber of the pressure applying device for deforming a flexible film thereof, and wherein the external pressure is applied to the electrical connection by means of the flexible film.

6. The vacuum assisted resin transfer molding method according to claim 5, wherein in step d) the flexible film adapts to a geometry of the electrical connection for an even distribution of the external pressure.

7. The vacuum assisted resin transfer molding method according to claim 5, wherein in step d) the chamber is inflated with the fluid by means of a manual pump.

8. The vacuum assisted resin transfer molding method according to claim 1, wherein the underpressure is reduced before applying heat in step f).

9. The vacuum assisted resin transfer molding method according to claim 1, wherein the external pressure provides an extra pressure between 100 mbar and 2000 mbar.

10. The vacuum assisted resin transfer molding method according to claim 1, wherein the applying the external pressure occurs during the subjecting the mold arrangement to underpressure.

* * * * *